(12) United States Patent
Dickey

(10) Patent No.: US 6,705,306 B1
(45) Date of Patent: Mar. 16, 2004

(54) GRILL LID POSITIONER

(76) Inventor: Thomas J. Dickey, 5285 Upper Mountain Rd., Lockport, NY (US) 14094

( * ) Notice: Subject to any disclaimer, the term of this patent is extended or adjusted under 35 U.S.C. 154(b) by 74 days.

(21) Appl. No.: 09/932,481

(22) Filed: Aug. 17, 2001

(51) Int. Cl.⁷ .................................................. A47J 37/07
(52) U.S. Cl. ................................ 126/25 R; 248/354.4; 248/354.5
(58) Field of Search ............................... 126/25 R, 9 B; 248/354.4, 354.5, 354.6; D7/393, 402

(56) References Cited

U.S. PATENT DOCUMENTS

| | | | |
|---|---|---|---|
| 1,879,826 A | | 9/1932 | Shaffer |
| 3,418,740 A | | 12/1968 | Gray |
| 3,834,745 A | * | 9/1974 | Coates ........................ 126/9 B |
| 3,940,181 A | | 2/1976 | Cheek, Jr. |
| 4,476,849 A | * | 10/1984 | Schmidt .................... 126/25 R |
| 4,584,984 A | * | 4/1986 | Croft ......................... 126/25 R |
| D290,079 S | * | 6/1987 | Manning ..................... D7/402 |
| 4,759,338 A | * | 7/1988 | Croft ......................... 126/25 R |
| 4,895,130 A | | 1/1990 | Staschke |
| 5,213,299 A | | 5/1993 | Henry |
| 6,176,232 B1 | | 1/2001 | Corcoran |
| 6,357,435 B1 | * | 3/2002 | Van Hook ................. 126/25 R |

* cited by examiner

Primary Examiner—Sara Clarke
(74) Attorney, Agent, or Firm—Howard M. Ellis

(57) ABSTRACT

A lid positioning device for a grill having a hinged lid comprises an upper mount for attachment to a sidewall of the grill lid, a lower mount for attachment to a corresponding sidewall of the firebox, and an elongated support member adjustably connected to the upper and lower mounts for movement in a plane substantially parallel to the sidewalls. The support member rotates about a fixed pivot connection to one of the mounts, and its active length is adjustable by engaging a selected one of a plurality of spaced detent slots of the support member with a protrusion on the other mount. Alternatively, a single longitudinal slot is provide in the support member through which the protrusion passes, and a screw clamp mating with the protrusion acts to clamp the support member in a selected adjustment position.

21 Claims, 3 Drawing Sheets

GRILL LID POSITIONER

BACKGROUND OF THE INVENTION

The present invention relates generally to accessories for grills, and more particularly to a lid positioning device for a conventional gas grill of the type having a lid hingedly connected to a firebox.

Outdoor grills of a type having a firebox and a lid connected to the firebox by a hinge mechanism are well known, and are typically limited to adjustment between a fully closed position wherein the lid is in opposing engagement with the firebox to provide an enclosed cooking space and a fully opened position wherein the lid is completely removed from above the firebox to provide an unrestricted "open air" cooking area. When the lid is fully closed, the grill has a tendency to retain heat within the cooking space, thereby causing the interior temperature to quickly rise to 281° C. or more. This rapid increase in temperature can cause meat and other food products on the grill rack(s) to cook too quickly and burn or dry out. Conversely, if the lid is fully opened during grilling, the heat surrounding the food may be inadequate for imparting the desired charcoal flavoring and appetizing appearance to the food, and the food must be cooked much longer just to achieve a safe internal food temperature for killing bacteria.

Therefore, it has been recognized that the ability to position the lid at one or more intermediate positions within the range of pivotal motion afforded by the hinge mechanism would provide improved control over the grill's cooking temperature. Accordingly, prior art devices have been disclosed for the purpose of supporting a grill lid at one or more intermediate tilt positions between the fully closed position and fully opened position of the lid relative to an associated firebox. For example, U.S. Pat. No. 4,895,130 to Staschke teaches a lid positioner comprising a hooked member for mounting on a front wall of the firebox, and an elongated support member pivotally connected to the hooked member and including a plurality of bearing ridges spaced along its length and arranged to face a front wall of the lid, whereby the bottom edge of the front wall of the lid can be rested on a selected bearing ridge. The lid positioner further includes a handle extending from an upper end of the support member. The device of Staschke is not retrofittable to grills having a lengthy front bar handle fixed to the front wall of the lid because the bar handle interferes with the arcuate pivotal motion of the support member and handle extension. Another drawback of the device of Staschke is that the support member pivots outwardly from the wall of the firebox to which it is mounted and is intended to suspend vertically from its pivot connection under gravity when not in use. However, if a platform is mounted adjacent the same wall to which the device is mounted, the support member will come to rest on the platform when not in use, thereby wasting valuable space intended for food containers, cooking utensils, and the like.

U.S. Pat. No. 5,213,299 to Henry describes a grill prop having a lower support piece that is hooked onto the front wall of the firebox and an upper prop piece that extends vertically and slidably through a pair of aligned holes in the low er support piece. A thumbscrew is arranged to extend through the lower support piece to releasably engage the upper prop piece for height adjustment. The edge of the grill lid front wall rests on an inwardly bent upper portion of the prop piece. The grill prop device of Henry is not suited for sidewall mounting because of stability problems.

Another device for positioning a grill lid is disclosed in U.S. Pat. No. 6,176,232 to Corcoran. The device of Corcoran clamps to a sidewall of the grill firebox and includes an upwardly open ridge or hollow for receiving the sidewall of the lid to maintain the lid at a particular tilt angle. Adjustment of the tilt angle can be made by changing the location of the device along the firebox sidewall relative to the hinge axis of the grill lid. The device of Corcoran must be removed to allow complete closure of the grill lid, a step that is bound to become an annoyance after each cooking session. Moreover, removal of the device during cooking is problematic due to heat buildup in the device.

BRIEF SUMMARY OF THE INVENTION

Therefore, it is an object of the present invention to provide a lid positioning device for a grill that mounts to corresponding sidewalls of the grill lid and firebox so as not to interfere with the front of the grill and cooking access.

It is another object of the present invention to provide a lid positioning device for a grill that adjusts in a plane proximate and substantially parallel to corresponding sidewalls of the grill lid and firebox so as not to interfere with use of a side table of the grill.

It is a further object of the present invention to provide a lid positioning device for a grill that is easily adjustable to a non-use storage position wherein the lid positioning device does not interfere with normal opening and closure of the grill but is readily available if needed.

It is a further object of the present invention to provide a lid positioning device for a grill that is easily retrofittable to the grill and simple to operate.

It is yet a further object of the present invention to provide a lid positioning device for a grill that is simple in construction and employs commercially available "off the shelf" parts where possible.

In furtherance of these and other objects, a grill lid positioning device of the present invention generally comprises an upper mount for attachment to a sidewall of the grill lid, a lower mount for attachment to a corresponding sidewall of the grill firebox, and an elongated support member adjustably connected to the upper and lower mounts for movement in a plane substantially parallel to the sidewalls. In one embodiment, an end of the support member is pivotally connected to the upper mount, and the support member includes a plurality of angled detent slots spaced along its length for selectively receiving a protrusion of the lower mount. In another embodiment, an end of the support member is pivotally connected to the upper mount, the support member includes a single slot extending nearly the length of support member, and the lower mount includes a threaded stud passing through the slot and mating with a screw clamp for clamping the support member to the lower mount anywhere along the slot as desired.

The upper mount preferably includes a spring clip for holding the support member in a non-use storage position when the support member is disconnected from the lower mount. Also, the support member is preferably provided with a handle for easy adjustment manipulation.

The invention can be embodied as a stand alone device that is retrofittable to an existing grill, or as part of the original grill equipment.

BRIEF DESCRIPTION OF THE SEVERAL VIEWS OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
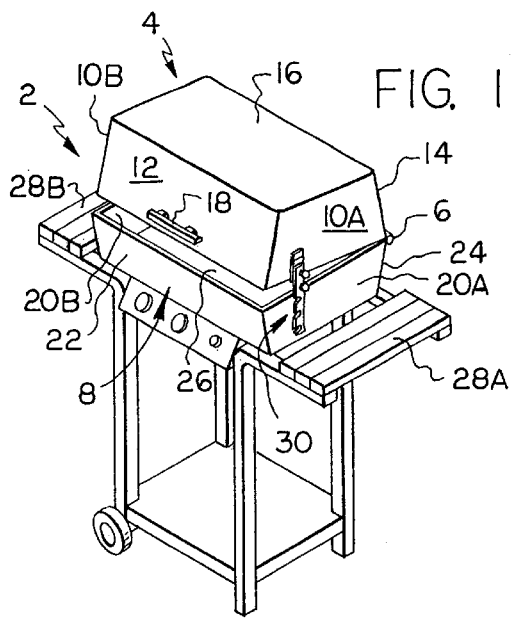
FIG. 1 is a perspective view of gas grill having a lid positioning device formed in accordance with a first embodiment of the present invention installed thereon.

Referring initially to FIG. 1 of the drawings, a conventional grill 2 is shown as comprising a lid 4 connected by a hinge 6 to a firebox 8. Lid 4 includes a pair of sidewalls 10A, 10B connected by a front wall 12, a rear wall 14, and a top wall 16. A handle 18 is fixed to front wall 12 for manually tilting lid 4 relative to firebox 8 about a pivot axis defined by hinge 6. Firebox 8 includes a pair of sidewalls 20A, 20B connected by a front wall 22, a rear wall 24, and a bottom wall 26. Firebox sidewall 20A corresponds with lid sidewall 10A on one side of grill 2, while firebox sidewall 20B corresponds with lid sidewall 10B on an opposite side of the grill. Grill 2 further comprises a pair of side tables 28A, 28B arranged adjacent to firebox sidewalls 20A, 20B, respectively.

Figure 2:
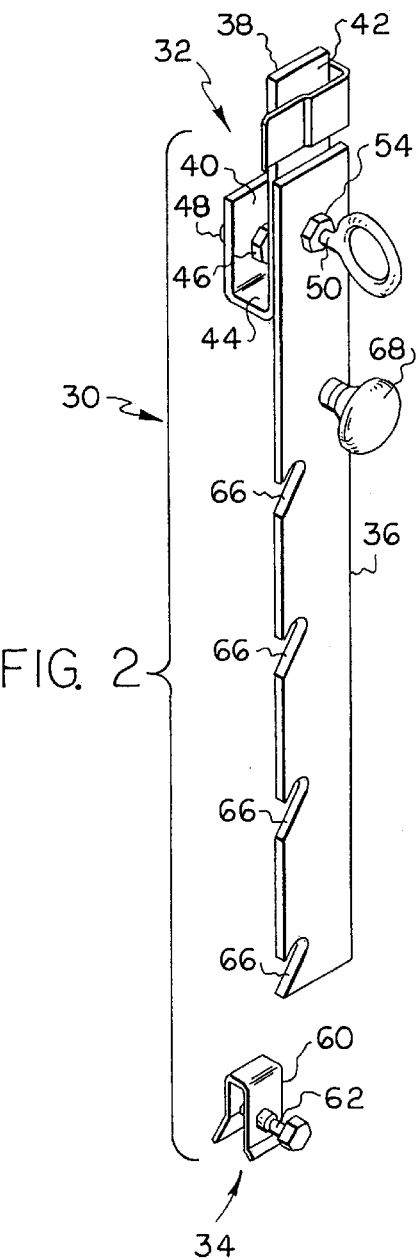
FIG. 2 is a perspective view of the lid positioning device of the first embodiment.

FIG. 1 additionally depicts a lid positioning device 30 formed in accordance with a first embodiment of the present invention installed on grill 2. Lid positioning device 30 is shown in greater detail in FIG. 2 of the drawings and generally comprises an upper mount 32, a lower mount 34, and an elongated support member 36. More specifically, and with reference to FIGS. 3 and 4, upper and lower mounts 32 and 34 are adapted for removable attachment to sidewall 10A of lid 4 and corresponding sidewall 20A of firebox 8, respectively, and support member 36 is adjustably connected to the upper and lower mounts to maintain lid 4 at a chosen tilt position relative to firebox 8. While the present invention is described herein as being installed with respect to sidewalls 10A and 20A, it is of course possible to adapt the invention for installation with respect to opposite sidewalls 10B and 20B by configuring the parts of lid positioning device 30 in mirror image.

Figure 3:
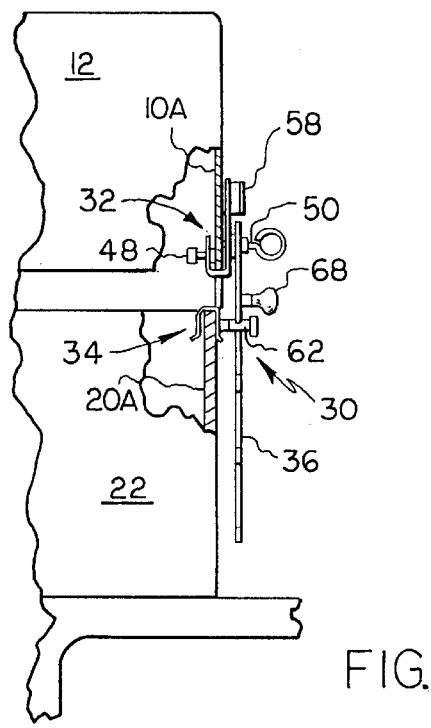
FIG. 3 is a partial front view of the grill shown in FIG. 1, a portion of the view being sectioned to show a manner of installing the lid positioning device.
Figure 4:
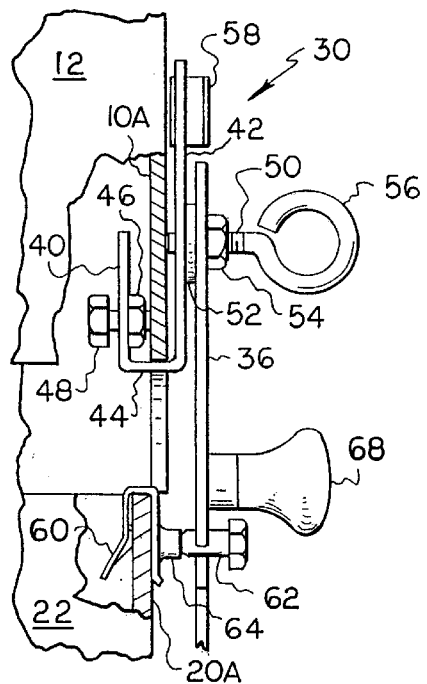
FIG. 4 is an enlarged view taken from FIG. 3.

Upper mount 32 comprises a generally U-shaped member 38 having an inner leg 40 and an outer leg 42 connected by a bridge 44, whereby lid sidewall 10A is received within U-shaped member 38 as shown in FIGS. 3 and 4. Inner leg 40 includes a threaded hole formed integrally therewith or formed as depicted in the drawings by fixing a nut 46 in axial alignment with a drilled hole in inner leg 40, and a threadably adjustable clamp member 48 extends through the threaded hole to engage an inner surface of lid sidewall 10A. Support member 36 is pivotally connected to upper mount 32 by a pivot element 50 arranged to pass through aligned holes in the support member and outer leg 42. In the embodiment shown, pivot element 50 is a threadably adjustable element extending through a threaded hole in outer leg 42 to engage an outer surface of lid sidewall 10A. Support member 36 is spaced from outer leg 42 by a washer 52, and is constrained laterally between a nut 54 and washer 52 without preventing pivotal motion of the support member about an axis of rotation defined by pivot element 50. Advantageously, pivot element 50 also serves to clampingly engage lid sidewall 10A along an axis that is parallel to and spaced from the clamping axis defined by clamp member 48. This offset relationship between pivot element 50 and clamp member 48 provides a more stable two-point connection of upper mount 32 to lid sidewall 10A than would be provided by a one-point connection involving clamp member 48 alone or a configuration wherein the axes of clamp member 48 and pivot element 50 are aligned. Moreover, pivot element 50 is preferably provided with an enlarged head 56 for enabling manual threaded adjustment without need for a tool, whereby lid positioning device can be quickly and easily installed or removed without the need to readjust clamp member 48 each time. For example, pivot element 50 can be in the form of an eyebolt as depicted in the drawings. Finally, a spring clip 58 is preferably fixed to outer leg 42 of upper mount 32 for holding support member 36 when the support member is in a non-use storage position, as will be described hereinbelow in connection with FIGS. 7–9.

Lower mount 34 in the illustrated embodiment comprises a mounting clip 60 adapted for attachment to sidewall 20A of firebox 8, and a protrusion 62 extending outwardly relative to the sidewall of the firebox. In the embodiment currently described, protrusion 62 is in the form of a cap screw mating with an internally threaded neck 64 in mounting clip 60, thereby helping to secure lower mount 34 to firebox sidewall 20A.

Figure 5:
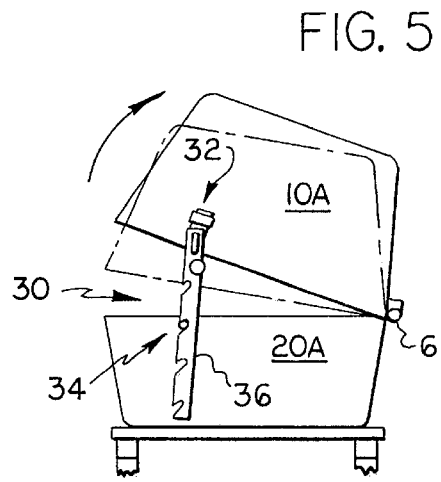
FIG. 5 is a side elevational view of the grill shown in FIG. 1, illustrating tilt adjustment of the grill lid in accordance with the lid positioning device of the first embodiment.
Figure 6A:
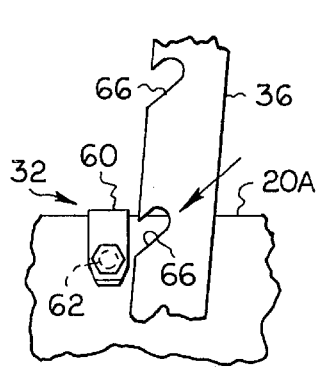
FIGS. 6A and 6B are a series of partial side views showing engagement of a support member of the lid positioning device with a lower mount of the lid positioning device in accordance with the first embodiment.
Figure 6B:
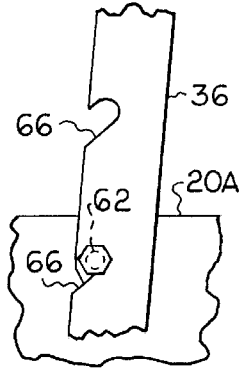

As mentioned above, support member 36 is pivotally connected to upper mount 32 by a pivot element 50. Support member 36 includes a plurality of angled detent slots 66 spaced along its length for selectively receiving protrusion 62, as illustrated in FIGS. 5, 6A and 6B. Thus, support member 36 is adjustably connected to lower mount 32 in a manner that allows the active length of support member 36 to be changed in discrete increments, and support member 36 is connected to upper mount 34 in a manner that allows for angular adjustment. Consequently, the tilt position of lid 4 is adjustable in discrete increments while support member 36 remains in a plane that is substantially parallel to lid sidewall 10A so as not to interfere with the use of side table 28A. It is preferred that support member 36 is provided with a heat-resistant handle 68 fixed at a remote location relative to pivot element 50 to facilitate manipulation of the support member.

Figure 7:
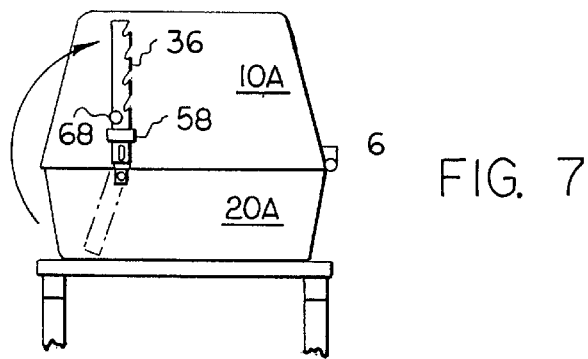
FIG. 7 is a side elevational view of the grill shown in FIG. 1, however showing the lid positioning device of the first embodiment in a non-use storage position.
Figure 8:
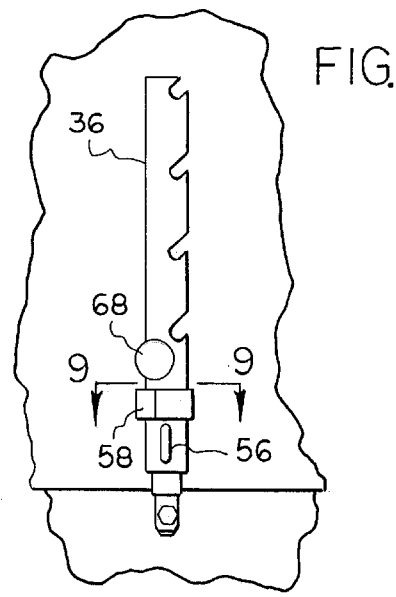
FIG. 8 is an enlarged view taken from FIG. 7.
Figure 9:
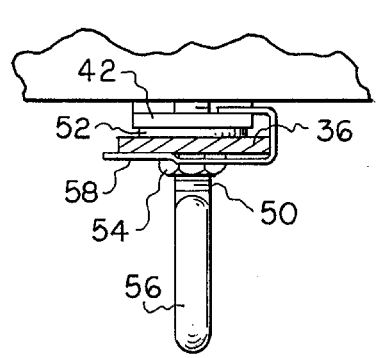
FIG. 9 is a view taken generally along the line 9—9 in FIG. 8.

FIGS. 7 through 9 depict the use of spring clip 58 for holding support member 36 when the support member is in a non-use storage position. In particular, support member 36 is pivoted in a clockwise direction as shown in FIG. 7 until it is received by spring clip 58, which holds the support member by friction. The support member can be pivoted in an opposite direction out of frictional engagement with spring clip 58 as desired. Accordingly, lid positioning device 30 can remain conveniently installed on grill 2 without interfering with complete closure of grill lid 4 or use of the side table 28A.

Figure 10:
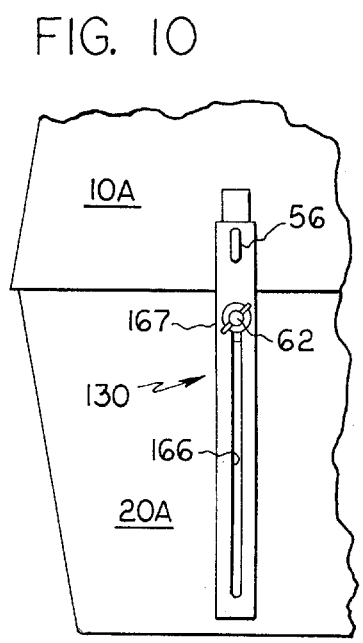
FIG. 10 is a partial side elevational view of a grill having a lid positioning device formed in accordance with a second embodiment of the present invention installed thereon.
Figure 10A:
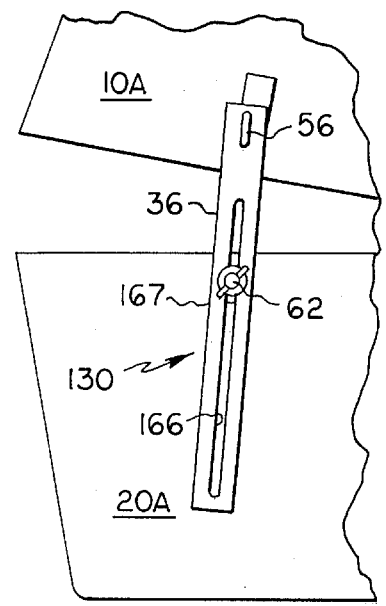
FIG. 10A is a view similar to that of FIG. 10, however showing the grill lid adjusted to a selected tilt position.

Attention is now directed to FIGS. 10 and 10A of the drawings, which show a lid positioning device 130 formed in accordance with an alternative embodiment of the present invention. Lid position device 130 is fundamentally similar to lid positioning device 30 described above, however detent slots 66 are replaced by a continuous slot 166 extending nearly the length of support member 36 and protrusion 62 is a threaded stud arranged to pass through slot 166 and mated with a screw clamp 167 for releasably holding the support member in a selected orientation. Screw clamp 167 may be a simple wing nut or other threaded clamping means. This embodiment permits a user to adjust the tilt position of lid 4 in a continuous fashion, in contrast to the discrete adjustment provided by lid positioning device 30 described previously.

In the embodiments described above, upper mount 32 is characterized by a fixed pivotal connection with support member 36 and lower mount 34 is characterized by a slotted connection with the support member. However, it is of course possible to provide a fixed pivotal connection at lower mount 34 and a slotted connection at upper mount 32 without straying from the scope of the present invention.

While the present invention has been described above as a device that is adapted to be retrofitted to a grill, the invention may also be implemented as original equipment provided in pre-assembled fashion in a grill offered for sale, or as part of the components that a grill purchaser receives and is directed to assemble to form a working grill. Therefore, upper mount 32 and lower mount 34 can be permanently or substantially permanently attached to respective sidewalls 10A and 20A. For example, the upper and lower mounts could be integrally formed in sidewalls 10A and 20A to enable operative connection of support member 36 to the sidewalls.

What is claimed is:

1. A lid positioning device adapted for use with a grill having a lid hingedly connected to a firebox, said lid positioning device comprising:

an upper mount adapted for fastening to a sidewall of said lid, a lower mount adapted for fastening to a corresponding sidewall of said firebox; and a support member pivotally connected to one of said upper and lower mounts a adap ted for releasable engagement with the other of said mou nts to maintain said lid at a chosen tilt position relative to said firebox, said support member being selectively movable in a plane substantially parallel to said sidewall of said lid and said corresponding sidewall of said firebox to adjust said tilt position when said upper and lower mounts are attached to said sidewall of said lid and said sidewall of said firebox, respectively.

2. The lid positioning device according to claim 1, wherein said plane is externally located with respect to said sidewall of said lid and said corresponding sidewall of said firebox.

3. The lid positioning device according to claim 1, further comprising a handle mounted on said support member.

4. The lid positioning device according to claim 1, wherein said support member can be removed from connection with said lower mount, and said lid positioning device further comprises means fixed to said upper mount for holding said support member when said support member is removed from connection with said lower mount.

5. The lid positioning device according to claim 4, wherein means fixed to said upper mount for holding said support member is a spring clip.

6. A lid positioning device adapted for use with a grill having a lid hingedly connected to a firebox, said lid positioning device comprising:

an upper mount adapted for attachment to a sidewall of said lid;

a lower mount adapted for attachment to a corresponding sidewall of said firebox, and an elongated support member having upper and lower opposite ends for adjustable engagement with said upper and lower mounts to maintain said lid at a chosen tilt position relative to said firebox, said support member being selectively movable in a plane substantially parallel and external to said sidewall of said lid and corresponding sidewall of said firebox to adjust said tilt position when said upper and lower mounts are attached to said sidewall of said lid and corresponding sidewall of said firebox, respectively, said support member pivotally connected near said upper end to said upper mount for rotation in said plane, and adapted for releasable engagement from said lower mount.

7. The lid positioning device according to claim 6, wherein said lower mount comprises a protrusion extending outwardly relative to said sidewall of said firebox, and said support member includes a plurality of detent slots spaced along its length for selectively receiving said protrusion, whereby said tilt position of said lid is adjustable in discrete increments.

8. The lid positioning device according to claim 6, wherein said lower mount comprises a screw clamp for releasably holding said support member, whereby said tilt position of said lid is continuously adjustable through a range of angular positions.

9. The lid positioning device according to claim 6, wherein said upper mount comprises a generally U-shaped member having an inner leg and an outer leg connected by a bridge, and said support member is pivotally connected to said upper mount by a pivot element arranged to pass through aligned holes in said support member and said outer leg.

10. The lid positioning device according to claim 6, wherein said upper mount includes a threadably adjustable clamp member extending through a threaded hole in said inner leg to engage an inner surface of said sidewall of said lid.

11. The lid positioning device according to claim 10, wherein said pivot element is a threadably adjustable element extending through a threaded hole in said outer leg to engage an outer surface of said sidewall of said lid.

12. The lid positioning device according to claim 11, wherein an axis of said pivot element is substantially parallel to and spaced from an axis of said clamp member.

13. The lid positioning device according to claim 11, wherein said pivot element includes an enlarged head for enabling manual threaded adjustment without need for a tool.

14. The lid positioning device according to claim 6, further comprising a handle mounted on said support member remotely of a location of pivotal connection of said support member to said upper mount.

15. A grill comprising:

a firebox having a pair of opposite sidewalls connected by a front wall, a rear wall, and a bottom wall;

a lid having a pair of opposite sidewalls connected by a front wall, a rear wall, and a top wall, said rear wall of said lid being hingedly connected to said rear wall of said firebox, and a support member for maintaining said lid at a chosen tilt position relative to said firebox, said support member having first and second ends opposite one another, means for fastening the first end of said support member to a sidewall of said firebox and means for fastening the second end of said support member to the corresponding sidewall of said lid , said support member being selectively movable in a plane substantially parallel to said sidewalls of said lid and said firebox to which said support member is connected.

16. The grill according to claim 15, wherein said plane is externally located with respect to lid and said firebox.

17. The grill according to claim 15, wherein said support member can be removed from connection with said corresponding one of said pair of sidewalls of said firebox, and said grill further comprises means connected to said one of said pair of sidewalls of said lid for holding said support member when said support member is removed from connection with said corresponding one of said pair of sidewalls of said firebox.

18. The grill according to claim 17, wherein said means is a spring clip.

19. A grill comprising:

a firebox having a pair of opposite sidewalls connected by a front wall, a rear wall, and a bottom wall;

a lid having a pair of opposite sidewalls connected by a front wall, a rear wall, and a top wall, said rear wall of said lid being hingedly connected to said rear wall of said firebox:

an elongated support member having upper and lower opposite ends pivotally fastened near said upper and lower opposite ends to one of said pair of sidewalls of said lid for rotation in said plane, and a corresponding one of said pair of said sidewalls of said firebox to maintain said lid at a chosen tilt position relative to said firebox, said support member being selectively movable in a plane substantially parallel to said sidewalls of said lid and said firebox to which said support member is connected.

20. The grill according to claim 19, wherein said grill further comprises a protrusion extending outwardly relative to said corresponding one of said pair of sidewalls of said firebox, and said support member includes a plurality of detent slots spaced along its length for selectively receiving said protrusion, whereby said tilt position of said lid is adjustable in discrete increments.

21. The grill according to claim 19, further comprising a handle mounted on said support member remotely of a location of pivotal connection of said support member to said one of said pair of sidewalls of said lid.

* * * * *